United States Patent
Cho et al.

(10) Patent No.: US 10,023,469 B2
(45) Date of Patent: Jul. 17, 2018

(54) METHOD FOR PRODUCING GRAPHENE WITH CONTROLLED NUMBER OF LAYERS, AND METHOD FOR MANUFACTURING ELECTRONIC DEVICE USING SAME

(71) Applicant: CENTER FOR ADVANCED SOFT ELECTRONICS, Pohang (KR)

(72) Inventors: Kilwon Cho, Pohang (KR); Hyo Chan Lee, Seoul (KR); Eun Ho Lee, Gunsan (KR)

(73) Assignee: CENTER FOR ADVANCED SOFT ELECTRONICS, Pohang (KR)

( * ) Notice: Subject to any disclaimer, the term of this patent is extended or adjusted under 35 U.S.C. 154(b) by 0 days.

(21) Appl. No.: 15/324,297

(22) PCT Filed: May 15, 2015

(86) PCT No.: PCT/KR2015/004897
§ 371 (c)(1),
(2) Date: Jan. 6, 2017

(87) PCT Pub. No.: WO2016/006818
PCT Pub. Date: Jan. 14, 2016

(65) Prior Publication Data
US 2017/0210629 A1   Jul. 27, 2017

(30) Foreign Application Priority Data
Jul. 7, 2014   (KR) .................. 10-2014-0084505

(51) Int. Cl.
*C01B 31/04* (2006.01)
*H01B 13/00* (2006.01)
(Continued)

(52) U.S. Cl.
CPC ..... *C01B 31/0453* (2013.01); *H01B 13/0036* (2013.01); *B82Y 30/00* (2013.01);
(Continued)

(58) Field of Classification Search
CPC ............ C01B 31/0453; C01B 2204/22; C01B 2204/04; H01B 13/0036; B82Y 40/00;
(Continued)

(56) References Cited

FOREIGN PATENT DOCUMENTS

| JP | 2010-212619 A | 4/2012 |
|---|---|---|
| JP | 2013-177273 A | 5/2014 |
| KR | 10-2009-0065206 A | 6/2009 |

OTHER PUBLICATIONS

Gong et al., Layer-Controlled and Wafer-Scale Synthesis of Uniform and High-Quality Graphene Films on a Polycrystalline Nickel Catalyst, Adv. Funct. Mater. 2012; 22: 3153-3159 with Supporting Information.*
(Continued)

*Primary Examiner* — Daniel C McCracken
(74) *Attorney, Agent, or Firm* — STIP Law Group, LLC

(57) ABSTRACT

Disclosed is a method of producing graphene, which includes bringing a metal catalyst into contact with hydrogen gas (Step a), bringing the metal catalyst in Step a into contact with at least one selected from among a hydrocarbon gas, nitrogen gas, and an inert gas (Step b), and forming graphene on the metal catalyst by bringing the metal catalyst in Step b into contact with hydrogen gas and a hydrocarbon gas (Step c), whereby the number of layers of graphene can be variously controlled as needed, regardless of the initial surface roughness of a metal catalyst layer, and also, the time required to form graphene can be shortened, thus reducing processing costs.

19 Claims, 10 Drawing Sheets

(51) Int. Cl.
*B82Y 40/00* (2011.01)
*B82Y 30/00* (2011.01)

(52) U.S. Cl.
CPC ........... *B82Y 40/00* (2013.01); *C01B 2204/04* (2013.01); *C01B 2204/22* (2013.01); *Y10S 977/734* (2013.01); *Y10S 977/843* (2013.01); *Y10S 977/932* (2013.01)

(58) Field of Classification Search
CPC .. B82Y 30/00; Y10S 977/734; Y10S 977/843; Y10S 977/932
See application file for complete search history.

(56) References Cited

OTHER PUBLICATIONS

Y. Gong et al, Layer-Controlled and Wafer-Scale Synthesis of Uniform and High-Quality Graphene Films on a Polycrystalline Nickel Catalyst, Adv. Fund. Mater. 2012, vol. 22, pp. 3153-3159, Wiley-VCH Verlag GmbH & Co., Germany.
International Search Report of PCT/KR20151004897, dated Aug. 15, 2015.

\* cited by examiner

[FIG. 1]
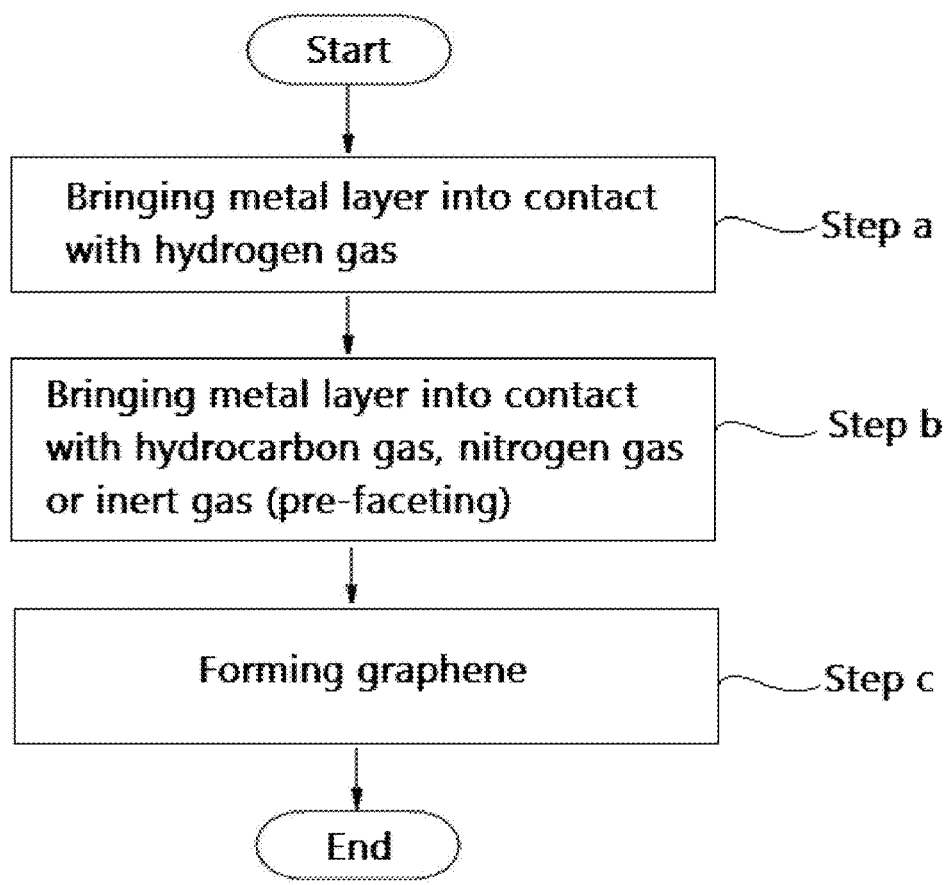

[FIG. 2]
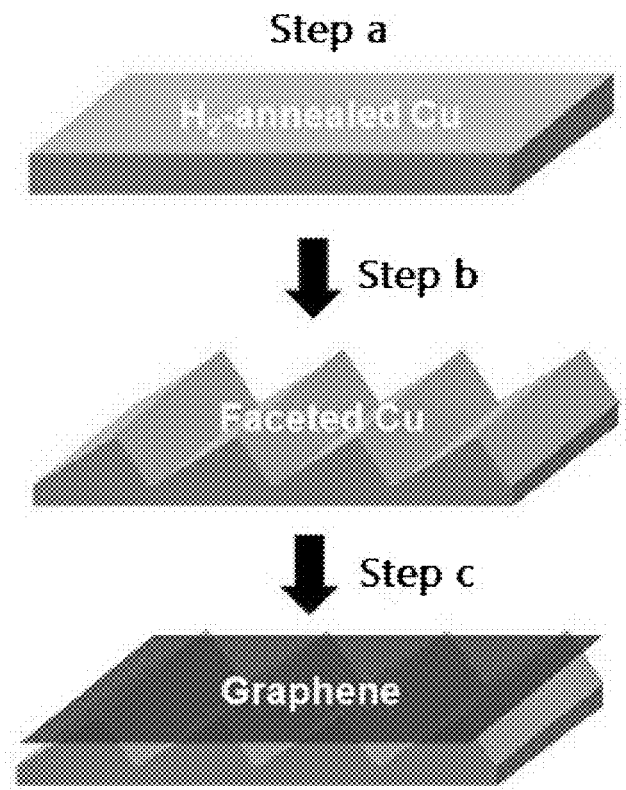
[FIG. 3]
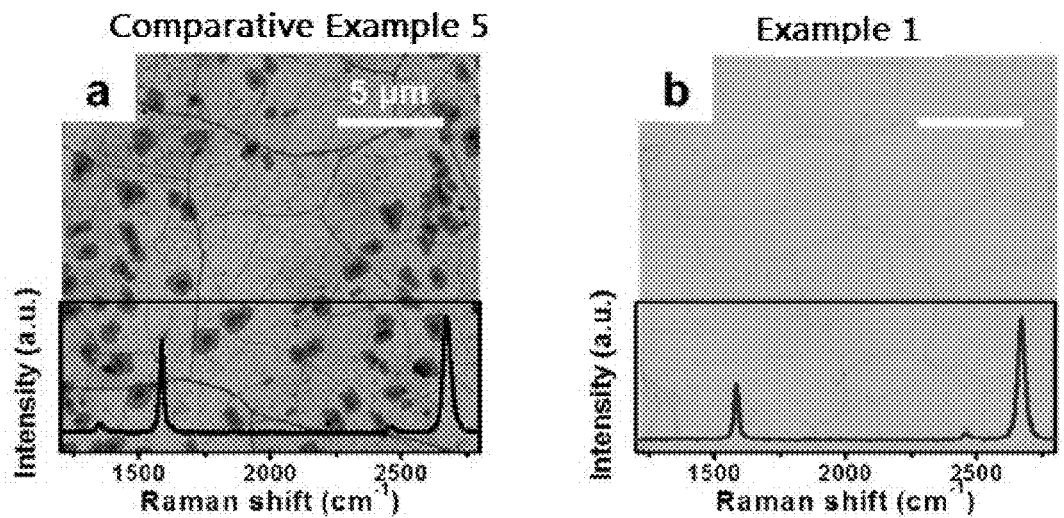

[FIG. 4]
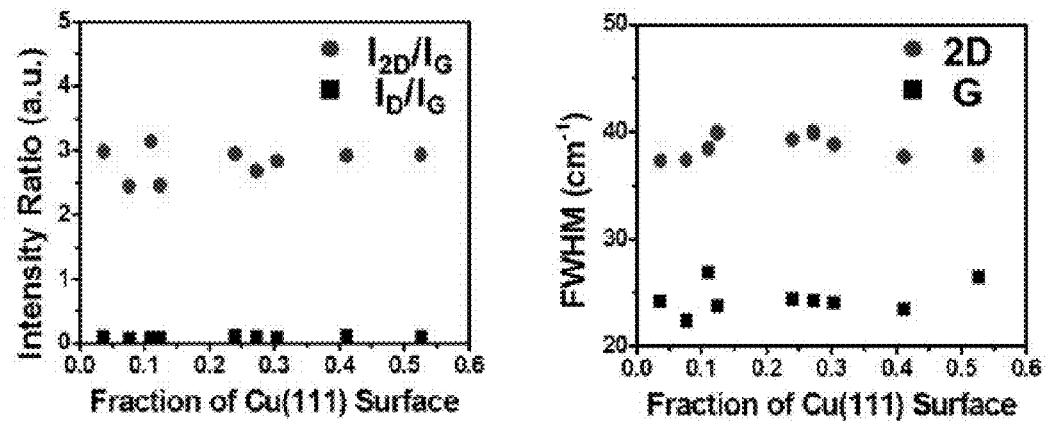
[FIG. 5]
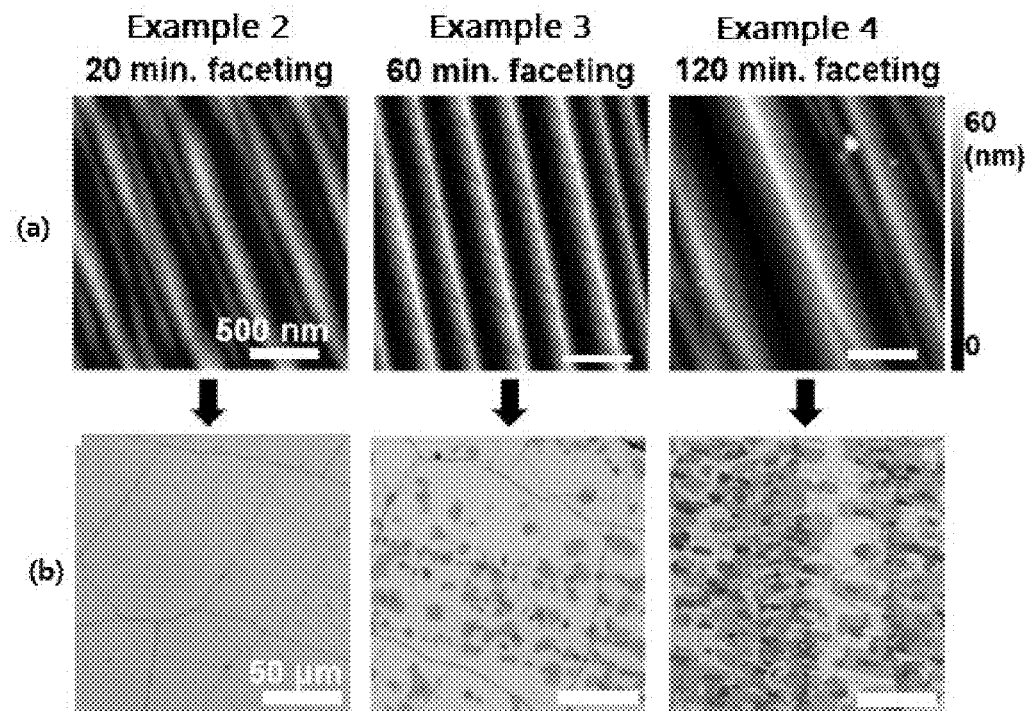

[FIG. 6]
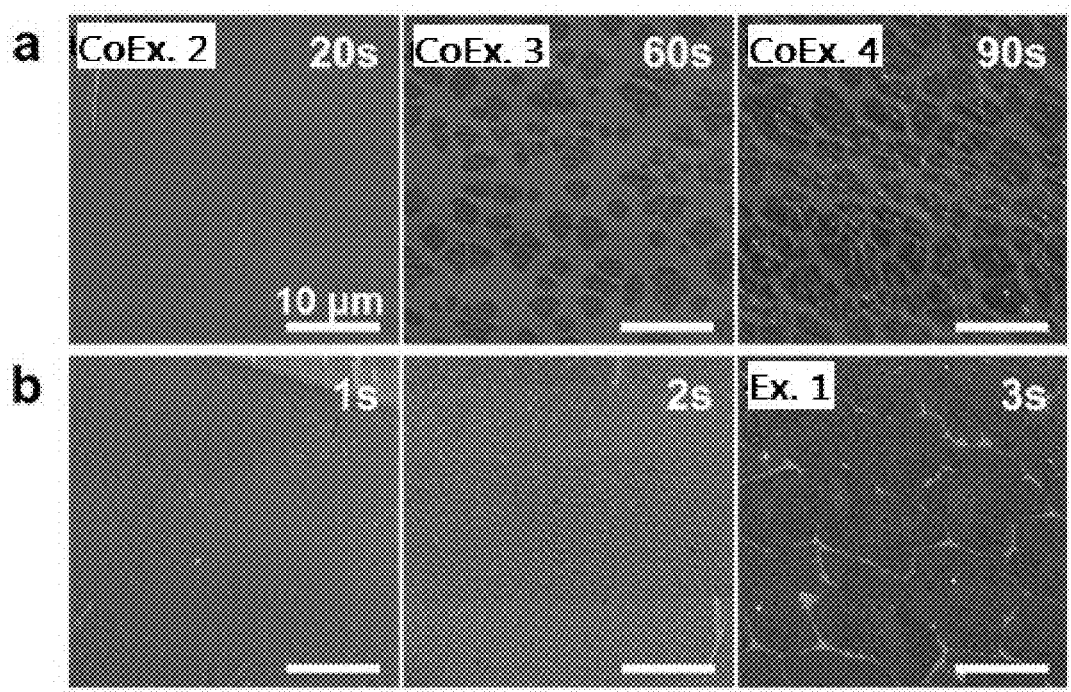
Ex.: Example
CoEx.: Comparative Example

[FIG. 7]
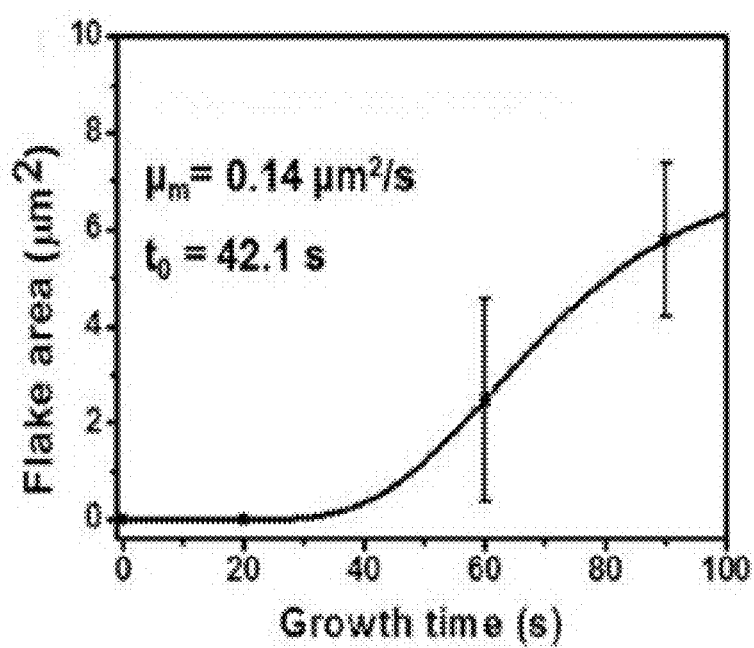

[FIG. 8]
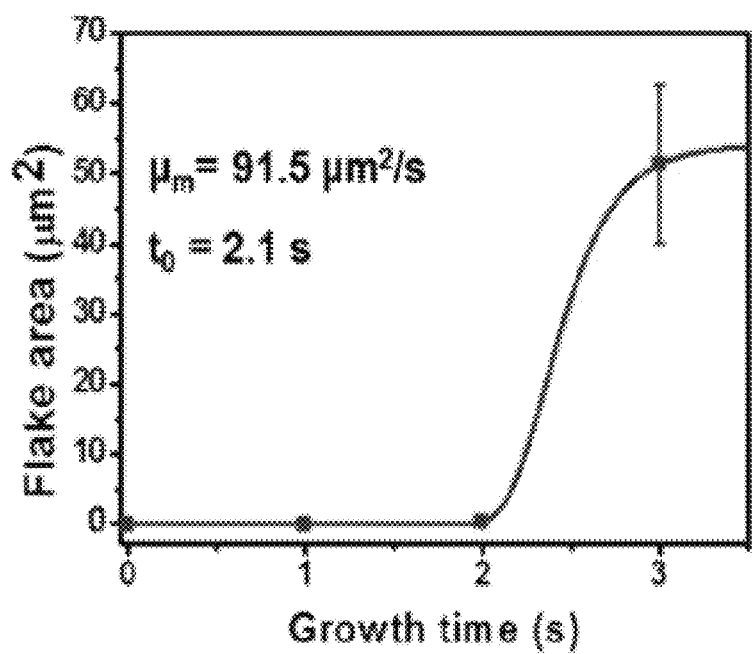

[FIG. 9]
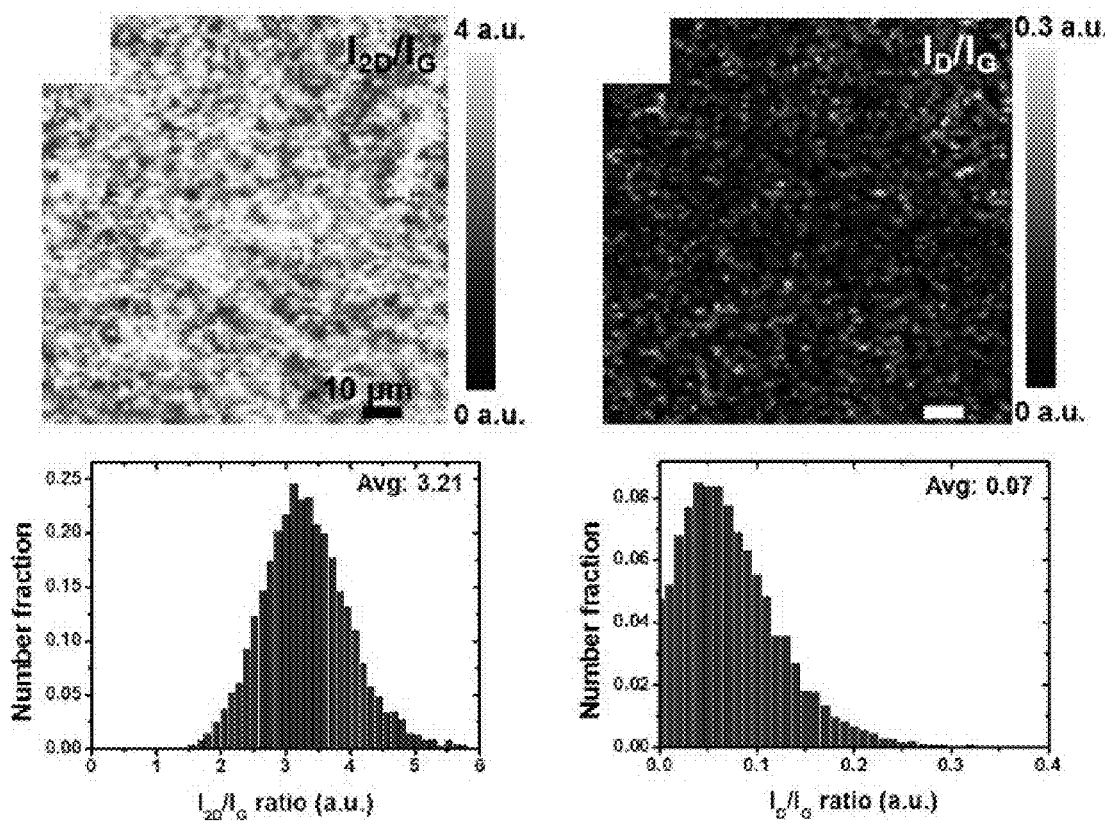

[FIG. 10]
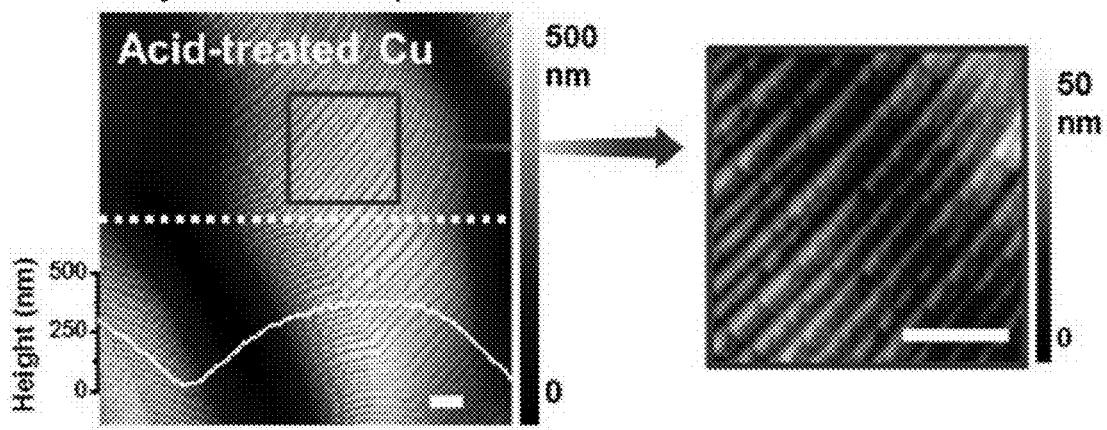
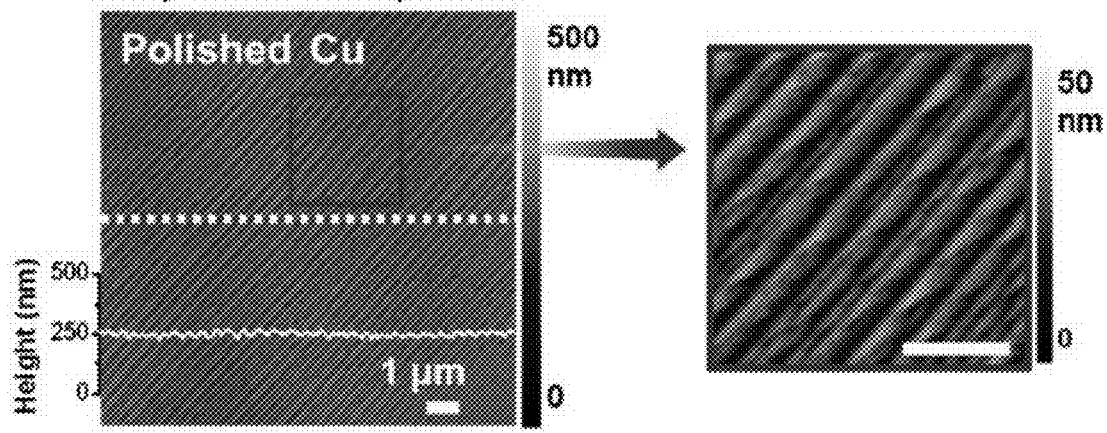

[FIG. 11]
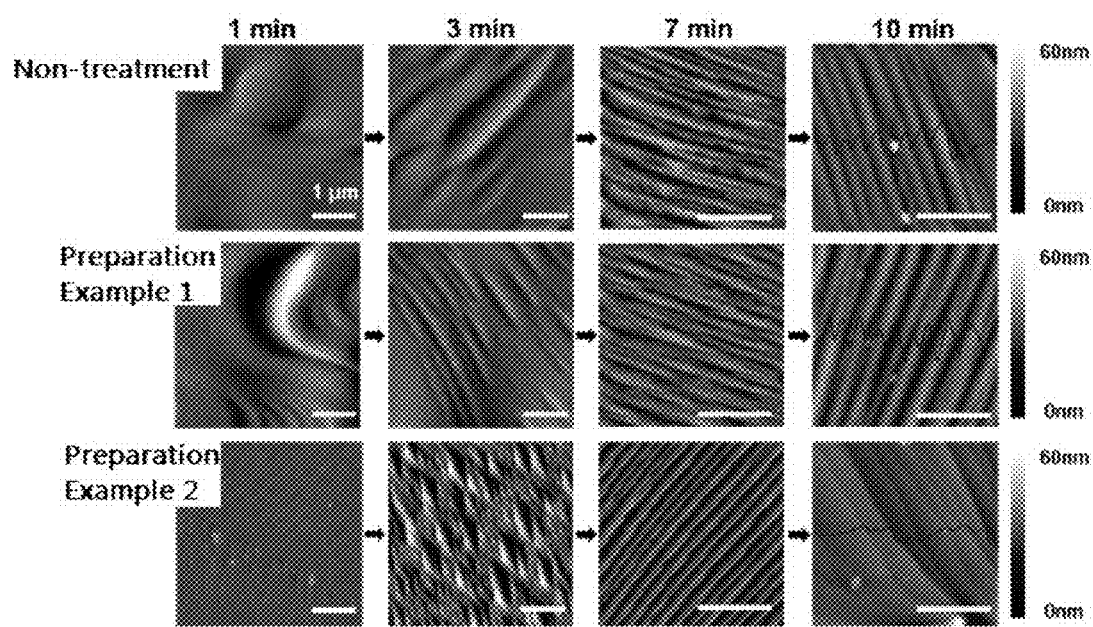

[FIG. 12]
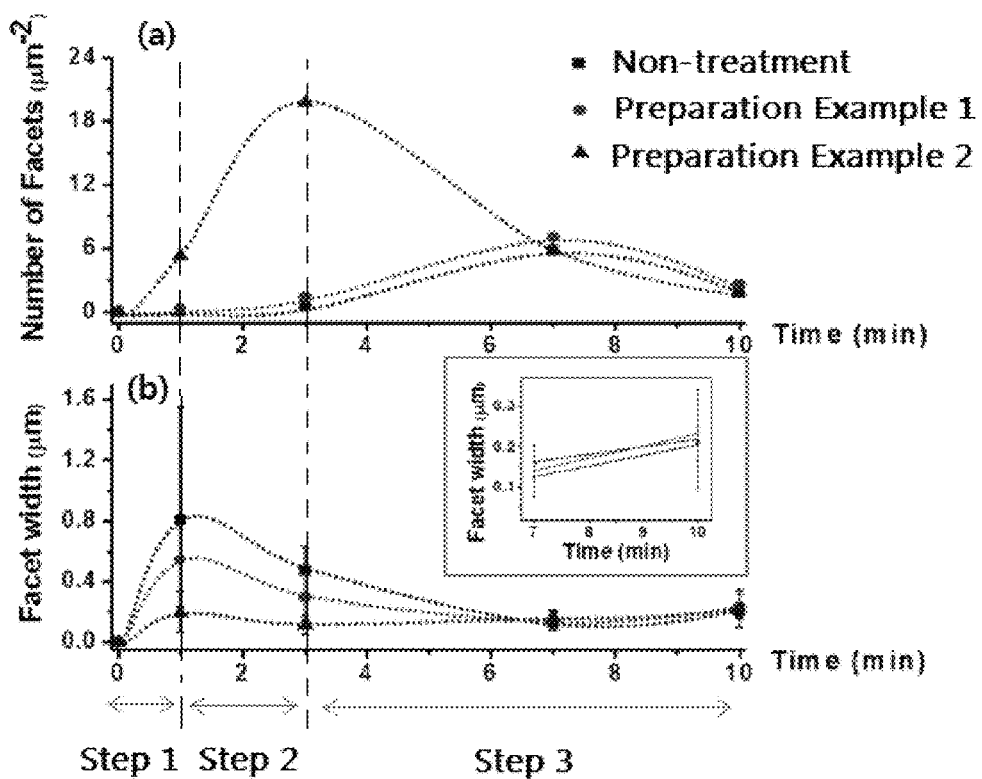

METHOD FOR PRODUCING GRAPHENE WITH CONTROLLED NUMBER OF LAYERS, AND METHOD FOR MANUFACTURING ELECTRONIC DEVICE USING SAME

CROSS-REFERENCE TO RELATED APPLICATIONS

This application is the U.S. National Phase under 35 U.S.C. § 371 of International Application No. PCT/KR2015/004897 filed on May 15, 2015, which in turn claims the benefit of Korean Application No. 10-2014-0084505, filed on Jul. 7, 2014, the disclosures of which are incorporated by reference into the present application.

TECHNICAL FIELD

The present invention relates to a method of producing graphene and a method of manufacturing an electronic device using the same, wherein the surface of a metal catalyst layer, on which graphene is formed, is controlled during chemical vapor deposition without pretreatment, thereby adjusting the number of layers of graphene and the characteristics thereof.

BACKGROUND ART

Graphene is a conductive material configured such that carbon atoms are arranged in two dimensions in a honeycomb shape that is as thin as a single atomic layer. It is formed into graphite when stacked in three dimensions, into carbon nanotubes when rolled up in one dimension, or into a fullerene ball shape when rolled up to have zero dimensions, and has become an important subject of thorough research to determine the wide variety of low-dimensional nanophenomena thereof.

As known in the art, graphene is very structurally and chemically stable and is a very good conductor because it is able to transport electrons 100 times faster than silicon and enables the flow of current about 100 times larger than copper. These characteristics of graphene, which were first predicted, have since been experimentally confirmed by discovering a method of separating graphene from graphite.

Graphene is composed exclusively of carbon, which is relatively lightweight, and is thus easily processed into a one-dimensional or two-dimensional nanopattern. Accordingly, semiconductor-conductor properties may be adjusted using graphene, and moreover, the fabrication of various functional devices, such as a sensor, a memory, etc., using graphene is possible by virtue of the flexibility of graphene.

Since mass synthesis methods have not been developed despite the excellent electrical, mechanical, and chemical properties of graphene, research into techniques for real-world applications thereof is somewhat limited.

The synthesis of graphene may include, for example, mechanical or chemical exfoliation, chemical vapor deposition, epitaxial synthesis, organic synthesis and the like. Among these, a chemical vapor deposition process is regarded as very suitable for mass production of graphene having high quality and a large area.

In conventional mass synthesis methods, graphite is mechanically ground, dispersed in a solution, and self-assembled to thus form a thin film. Such a mechanical grinding process enables the synthesis of graphene at relatively low cost, but is problematic because many graphene flakes are overlapped and interconnected, and thus the resulting electrical and mechanical properties do not meet expectations.

To date, the growth of graphene in the chemical vapor deposition process has depended on the surface morphology of a metal catalyst for the initial growth of graphene, that is, the surface roughness of a metal catalyst. When the surface of the metal catalyst is smooth, monolayer graphene may be easily grown, whereas when the surface thereof is rough, multilayer graphene may be grown.

In the case where a metal catalyst layer having an initially rough surface is used, even when the processing conditions for chemical vapor deposition are controlled, it is difficult to obtain monolayer graphene. Furthermore, the number of layers of graphene is dependent on the initial surface roughness of the metal catalyst layer, rather than the conditions for chemical vapor deposition, making it difficult to efficiently control the number of layers of graphene as needed.

DISCLOSURE

Technical Problem

Accordingly, the present invention is intended to provide a method of producing graphene through chemical vapor deposition, wherein the surface of a metal catalyst layer for growing graphene is controlled during chemical vapor deposition without pretreatment, whereby the number of layers of graphene may be variously adjusted as needed, regardless of the initial surface roughness of the metal catalyst layer, and moreover, the chemical vapor deposition time is shortened, thus reducing processing costs.

In addition, the present invention is intended to provide the fabrication of an electronic device, which includes monolayer graphene or multilayer graphene obtained by adjusting the number of layers of graphene, thus increasing the efficiency of the electronic device.

Technical Solution

An aspect of the present invention provides a method of producing graphene, comprising: bringing a metal catalyst into contact with hydrogen gas (Step a), bringing the metal catalyst in Step a into contact with at least one selected from among a hydrocarbon gas, nitrogen gas, and an inert gas (Step b), and forming graphene on the metal catalyst by bringing the metal catalyst in Step b into contact with hydrogen gas and a hydrocarbon gas (Step c).

Step b may comprise bringing the metal catalyst in Step a into contact with the hydrocarbon gas.

In Steps b and c, the hydrocarbon gas may be at least one selected from the group consisting of methane, ethane, ethylene, benzene, and ethanol.

The inert gas may be at least one selected from the group consisting of argon, helium, and neon.

Step b may be performed at a temperature of 500 to 1,500° C.

Step b may be performed at a flow rate of 10 to 1000 sccm using at least one selected from among a hydrocarbon gas and an inert gas.

The contact time in Step b may be adjusted to thus control the number of layers of graphene.

The metal catalyst may be at least one selected from the group consisting of copper, nickel, iron, platinum, palladium, ruthenium, and cobalt.

The method may further comprise forming the metal catalyst on a substrate, before Step a.

The substrate may include at least one selected from the group consisting of an inorganic material, a metal, and an oxide thereof.

The forming the metal catalyst on the substrate may be performed through any one process selected from the group consisting of sputtering, thermal evaporation, and e-beam evaporation.

The metal catalyst may be formed to a thickness of 0.1 to 100 μm on the substrate.

Step c may be performed at a temperature of 500 to 1,500° C.

Step c may be performed through any one process selected from the group consisting of low-pressure chemical vapor deposition, atmospheric-pressure chemical vapor deposition, plasma-enhanced chemical vapor deposition, Joule-heating chemical vapor deposition, and microwave chemical vapor deposition.

Another aspect of the present invention provides a method of manufacturing an electronic device, comprising: bringing a metal catalyst into contact with hydrogen gas (Step 1), bringing the metal catalyst in Step a into contact with at least one selected from among a hydrocarbon gas, nitrogen gas, and an inert gas (Step 2), forming graphene on the metal catalyst by bringing the metal catalyst in Step b into contact with hydrogen gas and a hydrocarbon gas (Step 3), obtaining the graphene by removing the metal catalyst from a product obtained in Step 3 (Step 4), and forming an electronic device including the graphene of Step 4 (Step 5).

The electronic device may be any one selected from the group consisting of an electrode, a touch panel, an electroluminescent display, a backlight, a radio-frequency identification (RFID) tag, a solar cell module, e-paper, a thin-film transistor (TFT), and a TFT array.

Advantageous Effects

In a method of producing graphene through chemical vapor deposition according to the present invention, the surface of a metal catalyst layer for growing graphene is controlled during chemical vapor deposition without pretreatment, whereby the number of layers of graphene can be variously adjusted as needed, regardless of the initial surface roughness of the metal catalyst layer, and moreover, the chemical vapor deposition time can be shortened, thus reducing processing costs.

Also, according to the present invention, an electronic device, which includes monolayer graphene or multilayer graphene obtained by adjusting the number of layers of graphene, can be manufactured, thus increasing the efficiency of the electronic device.

DESCRIPTION OF DRAWINGS

FIG. 1 is a flowchart sequentially showing a process of producing graphene according to the present invention;

FIG. 2 is a schematic view showing the process of producing graphene according to the present invention;

FIG. 3 shows scanning electron microscope (SEM) images and Raman analysis results of graphene produced in Comparative Example 5 and Example 1;

FIG. 4 shows the results of EBSD of the surface of copper for the Raman analysis results of graphene of Example 1;

FIG. 5 shows atomic force microscope (AFM) images (a) of the surfaces of copper catalyst layers of Examples 2 to 4 and SEM images (b) of graphene thereof;

FIG. 6 shows SEM images (a) of graphene formed through chemical vapor deposition without pre-faceting on the surface of a copper catalyst layer, and SEM images (b) of graphene formed through pre-faceting followed by chemical vapor deposition;

FIG. 7 shows the graphene area increase curve upon the formation of graphene through chemical vapor deposition;

FIG. 8 shows the graphene area increase curve upon the formation of graphene through pre-faceting on the surface of a copper catalyst layer followed by chemical vapor deposition;

FIG. 9 shows the Raman analysis results of graphene having an area of 100×100 μm$^2$ of Example 1;

FIG. 10 shows surface AFM images after faceting of the surfaces of copper catalyst layers through methane annealing of copper in Preparation Examples 1 and 2;

FIG. 11 shows AFM images of the surfaces of copper catalyst layers depending on the pre-faceting time; and FIG. 12 shows changes in the number of facets per unit area and changes in facet width depending on the pre-faceting time of the surface of the copper catalyst layer.

BEST MODE

The present invention may be embodied in many different forms and should not be construed as being limited only to the embodiments set forth herein, but should be construed as covering modifications, equivalents or alternatives falling within ideas and technical scopes of the present invention. In the description of the present invention, detailed descriptions of related known techniques incorporated herein will be omitted when it may make the gist of the present invention unclear.

The terms used herein are merely intended to explain specific embodiments and not to limit the present invention. Unless otherwise stated, the singular expression includes a plural expression. In this application, the terms "include" or "have" are used to designate the presence of features, numbers, steps, operations, elements, parts, or combinations thereof described in the specification, and should be understood so as not to exclude the presence or additional probability of one or more different features, numbers, steps, operations, elements, parts, or combinations thereof.

FIGS. 1 and 2 are a flowchart and a schematic view showing the process of producing graphene according to the present invention, respectively.

Hereinafter, a detailed description will be given of the method of producing graphene according to the present invention with reference to FIGS. 1 and 2.

First, a metal catalyst layer is brought into contact with hydrogen gas (Step a).

The metal catalyst layer functions to grow graphene, and may be formed of copper, nickel, platinum, iron, palladium, ruthenium, or cobalt. In addition thereto, any metal may be used, so long as it is able to induce the growth of graphene.

In some cases, forming a metal catalyst layer on a substrate may be further performed so that graphene is grown on the substrate, before Step a.

The substrate may be formed of an inorganic material, a metal, or an oxide thereof.

Examples of the inorganic material may include silicon, ceramic, and quartz, and examples of the metal may include aluminum, tin, copper, iron, cobalt, and stainless steel, but the scope of the present invention is not limited thereto. Any substrate may be used, so long as it is stable at the temperature that is applied in the production of graphene of the present invention and is able to stably support the metal catalyst layer.

Forming the metal catalyst layer on the substrate may be implemented through sputtering, thermal evaporation, or e-beam evaporation. Here, the metal catalyst layer formed on the substrate may have a thickness of 0.1 to 100 μm, preferably 0.3 to 10 μm, and more preferably 0.5 to 1 μm.

Next, the metal catalyst in Step a is brought into contact with at least one selected from among a hydrocarbon gas, nitrogen gas, and an inert gas (Step b).

Step b is a process of controlling the facet structure of the metal catalyst layer by changing the properties of the surface of the metal catalyst layer, before the formation of graphene. Here, the term "facet structure" refers to a structure configured such that two facets having different crystal orientations are repeatedly connected through bonding on the surface of the metal catalyst layer.

In the case where the formation of graphene is carried out in the absence of Step b, as in conventional methods, the formation of graphene and changes in the surface of the metal catalyst layer may occur at the same time, undesirably making it difficult to obtain a desired graphene configuration and resulting in graphene having defects.

As used herein, the term "faceting" refers to the formation of the facet structure, and Step b may be regarded as a pre-faceting step because the facet structure is formed on the surface of the metal in advance before the deposition of graphene.

Examples of the hydrocarbon gas may include methane, ethane, ethylene, benzene, and ethanol, and examples of the inert gas may include argon, helium, and neon.

The pre-faceting in Step b is preferably performed at a temperature of 500 to 1500° C., and more preferably 800 to 1000° C.

Upon pre-faceting in Step b, the flow rate of at least one selected from among the hydrocarbon gas, nitrogen gas and inert gas is preferably 10 to 1000 sccm, more preferably 50 to 200 sccm, and still more preferably 80 to 120 sccm.

When the pre-faceting time in Step b is adjusted, the number of layers of graphene to be formed in the subsequent step and the characteristics thereof may be controlled. In the present invention, the characteristics of the finally formed graphene may be adjusted depending on the number and width of facets formed on the metal catalyst layer, and the number and width of facets may be controlled by adjusting the annealing time.

Specifically, in the case where the pre-faceting is performed under the condition that the flow rate of at least one of methane and an inert gas is about 100 sccm and the temperature is set to about 1000° C., when the pre-faceting time is shorter than 60 min, monolayer graphene may result. On the other hand, when the pre-faceting time is longer than 60 min, multilayer graphene may be easily obtained.

In Step b, the gas flow rate and the time may vary depending on the temperature. When the gas flow rate and the time are appropriately controlled depending on the temperature, surface facets of the metal catalyst layer suitable for the desired number of layers of graphene may be formed.

Next, the metal catalyst layer, subjected to Step b, is brought into contact with hydrogen gas and a hydrocarbon gas to thus form graphene on the metal catalyst layer (Step c).

Step c may be performed at a temperature of 500 to 1500° C., and preferably 800 to 1000° C.

Step c may be carried out through low-pressure chemical vapor deposition, atmospheric-pressure chemical vapor deposition, plasma-enhanced chemical vapor deposition, Joule-heating chemical vapor deposition, microwave chemical vapor deposition, etc., but the scope of the present invention is not limited thereto.

Below is a description of a method of manufacturing an electronic device including graphene according to the present invention.

First, graphene is produced through Steps a to c of the method of producing graphene as mentioned above (Steps 1 to 3).

Next, the metal catalyst layer is removed from the metal catalyst layer/graphene layer obtained through Steps 1 to 3, thus obtaining graphene (Step 4).

Specifically, in a stack comprising the metal catalyst layer/graphene layer, a support layer is formed on the graphene layer, thus forming a stack comprising the metal catalyst layer/graphene layer/support layer.

The support layer may be formed of a polymer material, and particularly, an acrylate-based polymer material including polymethyl methacrylate (PMMA), or a silicone polymer, but the present invention is not limited thereto. The support layer may be formed through a process such as spin coating, dip coating, doctor blade coating, etc.

From the stack comprising the metal catalyst layer/graphene layer/support layer, the metal catalyst layer is removed, thus obtaining a stack comprising the support layer/graphene layer.

Next, an electronic device including the graphene obtained in Step 4 is manufactured (Step 5).

Specifically, the graphene layer is transferred onto a target substrate using the support layer/graphene layer, and then the support layer is removed.

The solvent useful in removal of the polymer support layer may include an organic solvent, such as chloroform, toluene, or acetone, and the organic solvent may be appropriately selected depending on the type of support material.

The substrate to which graphene produced through the aforementioned steps is transferred may be applied to a variety of electronic devices.

The graphene sheet transferred to the target substrate as mentioned above may be applied to flexible electronic devices, transparent electronic devices, etc., and may be widely utilized in electrodes, touch panels, electroluminescent displays, backlights, radio-frequency identification (RFID) tags, solar cell modules, e-paper, thin-film transistors (TFTs) for flat panel displays, and TFT arrays.

In the method of manufacturing the electronic device according to the present invention, transferring the graphene onto the target substrate is performed by way of example, but the scope of the present invention is not limited thereto. In addition to the transfer process, any process may be carried out so long as it enables the stable attachment of graphene to the substrate.

MODE FOR INVENTION

A better understanding of the present invention may be obtained through the following examples which are set forth to illustrate, but are not to be construed to limit the scope of the present invention.

PREPARATION EXAMPLE 1

Formation of Copper Thin Film having Rough Surface

A 99.999% copper thin film (Alfa Aesar #10950) was subjected to electrochemical polishing. Specifically, the copper thin film was immersed in a mixed solution of deionzied water and 85% phosphoric acid (volume ratio of deionized water to 85% phosphoric acid=1:2), the copper thin film functioning as an anode and the stainless steel beaker functioning as a cathode, and a voltage of 6 V was applied for 30 sec. Thereafter, the thin film was washed with deionized water and etched for 10 min in an ammonium persulfate aqueous solution at a concentration of 1 g/100 ml, thus obtaining a copper thin film having a rough surface.

PREPARATION EXAMPLE 2

Formation of Copper Thin Film having Smooth Surface

A 99.999% copper thin film (Alfa Aesar #10950) was subjected to electrochemical polishing. Specifically, the copper thin film was immersed in a mixed solution of deionzied water and 85% phosphoric acid (volume ratio of deionized water to 85% phosphoric acid=1:2), the copper thin film functioning as an anode and the stainless steel beaker functioning as a cathode, and a voltage of 8 V was applied for 40 sec. Thereafter, the thin film was rinsed with a 30% ammonia solution, deionized water and pure acetone, thus obtaining a copper thin film having a smooth surface.

EXAMPLE 1

To the copper thin film having a rough surface obtained in Preparation Example 1, hydrogen was allowed to flow at 100 sccm at 1000° C. for 1 hr, whereby the surface of the oxidized copper thin film was reduced. The reduced copper thin film was annealed with methane gas at 100 sccm at 1000° C. for 20 min, whereby pre-faceting was performed. Thereafter, 50 sccm of methane gas and 5 sccm of hydrogen gas were allowed to flow for 3 sec at the same time at a temperature of 1000° C., whereby chemical vapor deposition was carried out, thereby forming graphene on the copper thin film.

EXAMPLE 2

Graphene was formed in the same manner as in Example 1, with the exception that the copper thin film of Preparation Example 2 was used in lieu of the copper thin film having a rough surface of Preparation Example 1 and chemical vapor deposition was carried out for 20 sec rather than 3 sec.

EXAMPLE 3

Graphene was formed in the same manner as in Example 1, with the exception that the copper thin film of Preparation Example 2 was used in lieu of the copper thin film having a rough surface of Preparation Example 1, pre-faceting through methane gas annealing was performed for 60 min rather than 20 min, and chemical vapor deposition was carried out for 20 sec rather than 3 sec.

EXAMPLE 4

Graphene was formed in the same manner as in Example 1, with the exception that the copper thin film of Preparation Example 2 was used in lieu of the copper thin film having a rough surface of Preparation Example 1, pre-faceting through methane gas annealing was performed for 120 min rather than 20 min, and chemical vapor deposition was carried out for 20 sec rather than 3 sec.

EXAMPLE 5

To the copper thin film having a rough surface obtained in Preparation Example 1, hydrogen was allowed to flow at a flow rate of 20 sccm at 1000° C. for 20 min, whereby the copper thin film was reduced. The reduced copper thin film was annealed with 100 sccm of methane gas at 1000° C. for 10 min, whereby pre-faceting was performed. Thereafter, 50 sccm of methane gas and 5 sccm of hydrogen gas were allowed to flow for 20 sec at the same time at a temperature of 1000° C., whereby chemical vapor deposition was carried out, thereby forming graphene on the copper thin film.

EXAMPLE 6

Graphene was formed in the same manner as in Example 1, with the exception that pre-faceting was performed through annealing with nitrogen gas in lieu of methane gas.

EXAMPLE 7

Graphene was formed in the same manner as in Example 1, with the exception that pre-faceting was performed through annealing with argon gas in lieu of methane gas.

COMPARATIVE EXAMPLES

COMPARATIVE EXAMPLE 1

Graphene was formed in the same manner as in Example 1, with the exception that pre-faceting through methane gas annealing was not performed on the copper thin film, which was reduced by allowing hydrogen to flow.

COMPARATIVE EXAMPLE 2

Graphene was formed in the same manner as in Example 1, with the exception that pre-faceting through methane gas annealing was not performed on the copper thin film reduced by allowing hydrogen to flow and chemical vapor deposition was carried out for 20 sec rather than 3 sec.

COMPARATIVE EXAMPLE 3

Graphene was formed in the same manner as in Example 1, with the exception that pre-faceting through methane gas annealing was not performed on the copper thin film reduced by allowing hydrogen to flow and chemical vapor deposition was carried out for 60 sec rather than 3 sec.

COMPARATIVE EXAMPLE 4

Graphene was formed in the same manner as in Example 1, with the exception that pre-faceting through methane gas annealing was not performed on the copper thin film reduced by allowing hydrogen to flow and chemical vapor deposition was carried out for 90 sec rather than 3 sec.

COMPARATIVE EXAMPLE 5

Graphene was formed in the same manner as in Example 1, with the exception that pre-faceting through methane gas annealing was not performed on the copper thin film reduced by allowing hydrogen to flow and chemical vapor deposition was carried out for 10 min rather than 3 sec.

COMPARATIVE EXAMPLE 6

Graphene was formed in the same manner as in Example 1, with the exception that the copper thin film having a smooth surface of Preparation Example 2 was used in lieu of the copper thin film having a rough surface of Preparation Example 1, pre-faceting through methane gas annealing was not performed on the copper thin film reduced by allowing hydrogen to flow, and chemical vapor deposition was carried out for 10 min rather than 3 sec.

COMPARATIVE EXAMPLE 7

A graphene monolayer was mechanically exfoliated in a manner in which attaching and detaching a piece of adhesive tape to and from graphite was repeated two to three times, and was then transferred to a target substrate, thus manufacturing graphene.

The production conditions of Examples 1 to 5 and Comparative Examples 1 to 7 and the characteristics of the formed graphene are summarized in Table 1 below.

TABLE 1

| No. | Surface state of Cu thin film | $H_2$ contact (Step a) | | Pre-faceting (Step b) | | | Chemical vapor deposition (Step c) | | Graphene configuration |
|---|---|---|---|---|---|---|---|---|---|
| | | Flow rate (sccm) | Time (min) | Gas | Flow rate (sccm) | Time (min) | $CH_4/H_2$ flow rate (sccm) | Time (sec) | |
| Ex. 1 | Rough | 100 | 60 | $CH_4$ | 100 | 20 | 50/5 | 3 | Monolayer |
| Ex. 2 | Smooth | 100 | 60 | $CH_4$ | 100 | 20 | 50/5 | 20 | Monolayer |
| Ex. 3 | Smooth | 100 | 60 | $CH_4$ | 100 | 60 | 50/5 | 20 | Multilayer |
| Ex. 4 | Smooth | 100 | 60 | $CH_4$ | 100 | 120 | 50/5 | 20 | Multilayer |
| Ex. 5 | Rough | 20 | 20 | $CH_4$ | 100 | 10 | 50/5 | 20 | Monolayer |
| Ex. 6 | Rough | 100 | 60 | $N_2$ | 100 | 20 | 50/5 | 3 | Monolayer |
| Ex. 7 | Rough | 100 | 60 | Ar | 100 | 20 | 50/5 | 3 | Monolayer |
| C. Ex. 1 | Rough | 100 | 60 | — | — | — | 50/5 | 3 | Not formed |
| C. Ex. 2 | Rough | 100 | 60 | — | — | — | 50/5 | 20 | Not formed |
| C. Ex. 3 | Rough | 100 | 60 | — | — | — | 50/5 | 60 | Multilayer (partially formed) |
| C. Ex. 4 | Rough | 100 | 60 | — | — | — | 50/5 | 90 | Multilayer |
| C. Ex. 5 | Rough | 100 | 60 | — | — | — | 50/5 | 600 | Multilayer |
| C. Ex. 6 | Smooth | 100 | 60 | — | — | — | 50/5 | 600 | Monolayer |
| C. Ex. 7 | | Mechanical exfoliation | | | | | | | Monolayer |

DEVICE EXAMPLE 1

The graphene layer of Example 5 was spin-coated with polymethyl methacrylate (PMMA) to form a stack comprising PMMA/graphene/copper, and the copper layer was then etched in an ammonium persulfate solution (1 g/100 ml) for several hours. Thereafter, the copper layer-free PMMA/graphene stack was rinsed with deionized water for 1 hr, transferred to a target substrate, and deposited with a gold electrode at a thickness of 100 nm, thus manufacturing a field-effect transistor (FET).

DEVICE COMPARATIVE EXAMPLE 1

An FET was manufactured by depositing an electrode through e-beam evaporation on the graphene of Comparative Example 7.

TEST EXAMPLES

The measurement methods in test examples of the present invention are as follows.

Changes in the surface of copper were measured using an SEM (Scanning Electron Microscope) and an AFM (Atomic Force Microscope) (Digital Instruments Multimode Nanoscope III).

XRD (X-ray Diffraction) was measured at the 9C beamline (wavelength of 1.08 Å) of the Pohang Light Source.

The grown graphene configuration was analyzed at 488 nm using a Raman spectrophotometer (WITec, Micro Raman).

TEST EXAMPLE 1

Effect of Methane Annealing on Graphene Configuration

The SEM images and Raman analysis results of graphene of Comparative Example 5 and Example 1 are shown in FIG. 3. The results of the fraction of a Cu(111) surface for I(2D)/I(G) and I(D)/I(G) values of graphene of Example 1 and the results of the fraction of a Cu(111) surface for FWHM (Full Width at Half Maximum) of G peak and 2D peak are shown in FIG. 4.

As shown in FIGS. 3 and 4, graphene was formed in a monolayer configuration in Example 1, and was formed in a multilayer configuration in Comparative Example 5 using a conventional process. Also, in the graphene of Comparative Example 5, a defect-related D peak (~1350) was clearly apparent, whereas the graphene of Example 1 did not show a D peak. Also, the 2D peak (~2800)/G (~1600) ratio was higher in the graphene of Example 1 than in Comparative Example 5. Thereby, the introduction of methane annealing, namely pre-faceting according to the present invention, can be found to make it easier to form monolayer graphene even on a copper thin film having a rough surface.

Furthermore, the I(2D)/I(G) ratio is known to be proportional to the fraction of a (111) surface on the copper surface. Thus, the I(D)/I(G) value was less than 0.1 for all copper grains of Example 1, which means that graphene having no defects was synthesized.

Moreover, the I(2D)/I(G) ratio, FWHM of G peak, and FWHM of 2D peak had no relationship with the copper surface. Thereby, graphene was found to be independently formed without regard to copper grains.

TEST EXAMPLE 2

Effect of Pre-faceting Time on Graphene Configuration

In order to analyze the relationship between the facet morphology of the copper surface depending on the pre-faceting time through methane gas annealing and the configuration of graphene finally formed through chemical vapor deposition, the AFM images (a) of the copper surfaces of Examples 2 to 4 and the SEM images (b) of graphene thereof are shown in FIG. 5.

As shown in FIG. 5, the facet area on the copper surface on which faceting occurred was adjusted depending on the methane annealing time, and the configuration of graphene formed on the copper surface on which faceting occurred varied depending on the methane annealing time in the previous step. Specifically, when the methane annealing time was less than 60 min, monolayer graphene was synthesized. On the other hand, when the methane annealing time was longer than 60 min, multilayer graphene was formed.

These results indicate that the configuration of graphene on the copper layer becomes different based on the facet width of the copper layer, which varied depending on the methane annealing time. The facet width of the copper layer is regarded as important in the nucleation of graphene. If the graphene configuration is changed by the micro-scale morphology on the surface of the first given copper layer, a similar graphene configuration may result, regardless of changes in methane annealing time. More specifically, it is difficult to cause micro-scale changes on the copper surface at about 1000° C., and thus faceting is deemed to correspond to submicro-scale changes, and such changes in submicro-scale surface morphology can be found to affect the graphene configuration.

Furthermore, based on the above results, the number of layers of graphene can be concluded to be adjusted by regulating the methane annealing time for pre-faceting.

TEST EXAMPLE 3

Effect of Pre-faceting on Chemical Vapor Deposition Time

In order to evaluate the effect of the methane annealing for surface faceting of a copper catalyst layer on the chemical vapor deposition time, the SEM images of graphene, formed by performing chemical vapor deposition without pre-faceting (a), and formed by performing pre-faceting and then chemical vapor deposition (b), are shown in FIG. 6. In (a) and (b), the graphene area increase curves depending on the vapor deposition time are shown in FIGS. 7 and 8, respectively. Herein, $\mu_m$ represents the maximum growth rate of graphene, and $t_0$ represents the time required to supersaturate the carbon reactant, in which $t_0$ may be considered as the minimum time required to form graphene.

As shown in FIGS. 6 to 8, when the pre-faceting step was not performed, the minimum time required to form graphene through chemical vapor deposition was measured to be 42.1 sec, and the maximum growth rate of graphene was 0.14 $\mu m^2/s$. On the other hand, when the pre-faceting step and then the chemical vapor deposition step were performed according to the present invention, the minimum time required to form graphene was 2.1 sec, which was about 20 times shorter than when using a conventional process, and the maximum growth rate of graphene was increased about 900 times.

Therefore, the method of producing graphene according to the present invention includes a methane annealing step for faceting the surface of the copper catalyst layer before chemical vapor deposition, thus remarkably reducing the chemical vapor deposition time for forming the graphene, thereby increasing processing efficiency.

TEST EXAMPLE 4

Effect of Pre-faceting on Graphene Growth Uniformity

In order to evaluate the extent of graphene synthesis on a large scale, graphene having an area of 100×100 $\mu m^2$ of Example 1 was subjected to Raman analysis. The results are shown in FIG. 9.

As shown in FIG. 9, in the graphene of Example 1, the average of I(2D)/I(G) was 3.21 and the I(D)/I(G) was less than 0.2 in the range over 98%. Thus, large-scale graphene having few defects was uniformly synthesized.

TEST EXAMPLE 5

Effect of Copper Surface on Graphene Configuration

In order to analyze the properties of the copper surface affecting the configuration of graphene formed on the surface of copper, the copper thin film having a rough surface of Preparation Example 1 and the copper thin film having a smooth surface of Preparation Example 2 were subjected to hydrogen contact and methane annealing steps in the same manner as in Example 1, and then chemical vapor deposition was not performed. The AFM images of the copper surfaces were observed. The results are shown in FIG. 10.

As shown in FIG. 10, the copper surface morphologies of Preparation Examples 1 and 2 represented the rough state and the smooth state on a micro-scale (left drawings), respectively, but there was no great difference between the above two copper surfaces on a submicro-scale (right drawings).

This is deemed to be because the carbon annealing is performed at 1000° C., which is lower than the melting point of copper, and the movement of copper atoms on a large micro-scale is difficult and pre-faceting occurs through slight atomic movement on a relatively small submicro-scale. That is, the copper surface is seen to be formed with nano-sized facets of 300 nm or less regardless of the surface roughness (micro-scale).

The above results indicate that control of the graphene configuration in the present invention has no relationship with initial copper surface roughness but is realized by adjusting the facet structure on a submicro-scale through methane annealing.

TEST EXAMPLE 6

Changes in Facets of Copper Catalyst Layer Depending on Pre-faceting Time

In order to observe changes in facets depending on the pre-faceting time on various copper surfaces, an untreated 99.999% copper thin film (Alfa Aesar #10950) (a), the copper thin film having a rough surface of Preparation Example 1 (b), and the copper thin film of Preparation Example 2 (c) were annealed with methane for 10 min, so that the extent of pre-faceting was observed. The untreated initial copper thin film (a) showed a rough surface having a striated shape due to rolling.

Based on these results, the AFM images depending on the methane annealing time are shown in FIG. 11, and changes in the number of facets per unit area depending on the methane annealing time and changes in the width of the formed facets are shown in FIG. 12.

As shown in FIGS. 11 and 12, the above three kinds of copper thin films were determined through analysis to have been subjected to three steps for pre-faceting.

In the first step, faceting was initiated on a specific portion of the copper surface. A group of the produced facets constituted a facet domain on the copper surface, and in this step, the facets were formed, and simultaneously, the width thereof was increased.

Next, in the second step, facet domains coalesced, and the proportion of the facet domains on the copper surface was increased. In this step, the number of facets was increased but the average width thereof was gradually decreased. A decrease in facet width may be considered to be due to the mutually repulsive force of the facets.

Next, in the third step, the facets were formed on the entire surface of copper, and coalescence thereof progressed, whereby the number of facets was decreased and the width thereof was increased again from about 7 min.

Before the second step, more facets were formed on the copper thin film (c). That is, a copper thin film having a smooth surface is favorable in terms of forming facets associated with the formation of graphene.

However, after the pre-faceting was sufficiently performed through the third step, a similar number and width of facets resulted regardless of the surface roughness of the copper thin film.

Therefore, in the present invention, when methane or nitrogen annealing for pre-faceting is introduced before chemical vapor deposition for forming graphene, a surface state that facilitates the formation of a monolayer regardless of the initial roughness of the copper catalyst layer can be achieved.

The invention claimed is:

1. A method of producing graphene, comprising:
   (a) bringing a metal catalyst into contact with a hydrogen gas;
   (b) bringing the metal catalyst in the step (a) into contact with a flow of gas, wherein the flow of gas comprises any one selected from the group consisting of a hydrocarbon gas, a nitrogen gas, an inert gas, and a mixture of a nitrogen gas and an inert gas; and
   (c) forming graphene on the metal catalyst by bringing the metal catalyst in the step (b) into contact with a hydrogen gas and a hydrocarbon gas.

2. The method of claim 1, wherein in the step (b), the flow of gas comprises the hydrocarbon gas.

3. The method of claim 2, wherein the step (c) comprises forming graphene on the metal catalyst by bringing the metal catalyst in the step (b) into contact with the hydrogen gas.

4. The method of claim 1, wherein in the step (b) and the step (c), the hydrocarbon gas is at least one selected from the group consisting of methane, ethane, ethylene, benzene, and ethanol.

5. The method of claim 1, wherein the inert gas is at least one selected from the group consisting of argon, helium, and neon.

6. The method of claim 1, wherein the step (b) is performed at a temperature of 500 to 1,500° C.

7. The method of claim 6, wherein the step (b) is performed at a flow rate of 10 to 1000 sccm using at least one selected from the group consisting of the hydrocarbon gas and the inert gas.

8. The method of claim 1, wherein a contact time in the step (b) is adjusted to thus control a number of layers of graphene.

9. The method of claim 1, wherein the metal catalyst includes at least one selected from the group consisting of copper, nickel, iron, platinum, palladium, ruthenium, and cobalt.

10. The method of claim 1, further comprising forming the metal catalyst on a substrate, before the step (a).

11. The method of claim 10, wherein the substrate includes at least one selected from the group consisting of an inorganic material, a metal, and an oxide thereof.

12. The method of claim 10, wherein the forming the metal catalyst on the substrate is performed through any one process selected from the group consisting of sputtering, thermal evaporation, and e-beam evaporation.

13. The method of claim 1, wherein the metal catalyst is formed to a thickness of 0.5 to 100 μm on the substrate.

14. The method of claim 1, wherein the step (c) is performed at a temperature of 500 to 1,500° C.

15. The method of claim 1, wherein the step (c) is performed through any one process selected from the group consisting of low-pressure chemical vapor deposition, atmospheric-pressure chemical vapor deposition, plasma-enhanced chemical vapor deposition, Joule-heating chemical vapor deposition, and microwave chemical vapor deposition.

16. A method of manufacturing an electronic device, comprising:
   (1) bringing a metal catalyst into contact with a hydrogen gas;
   (2) bringing the metal catalyst in the step (1) into contact with a flow of gas, wherein the flow of gas comprises any one selected from the group consisting of a hydrocarbon gas, a nitrogen gas, an inert gas, and a mixture of a nitrogen gas and an inert gas;
   (3) forming graphene on the metal catalyst by bringing the metal catalyst in the step (2) into contact with a hydrogen gas and a hydrocarbon gas;
   (4) obtaining the graphene by removing the metal catalyst from a product obtained in the step (3); and
   (5) forming an electronic device including the graphene of the step (4).

17. The method of claim 16, wherein the electronic device is any one selected from the group consisting of an electrode, a touch panel, an electroluminescent display, a backlight, a radio-frequency identification (RFID) tag, a solar cell module, an e-paper, a thin-film transistor (TFT), and a TFT array.

18. The method of claim 1, wherein the step (b) forms facets on a surface of the metal catalyst.

19. The method of claim 16, wherein the step (2) forms facets on a surface of the metal catalyst.

* * * * *